Dec. 19, 1961  G. E. BOLLIBON ET AL  3,013,500
SEALED DYNAMOELECTRIC MACHINE
Filed July 10, 1958  4 Sheets-Sheet 1

United States Patent Office 3,013,500
Patented Dec. 19, 1961

3,013,500
SEALED DYNAMOELECTRIC MACHINE
George E. Bollibon, Penn Hills Township, Allegheny County, and Edward A. Macha, Monroeville, Pa., assignors to Westinghouse Electric Corporation, East Pittsburgh, Pa., a corporation of Pennsylvania
Filed July 10, 1958, Ser. No. 747,771
4 Claims. (Cl. 103—87)

The present invention relates to dynamoelectric machinery and more particularly to a motor-pump unit adapted for pumping fluids at elevated temperatures in which the bearings of the pump are lubricated by the fluid being pumped.

Motor-pump units of the character described frequently are employed in sealed applications wherein a high temperature fluid being handled by the pump also is employed to lubricate the bearings of the driving motor associated with the pump and to remove electrical losses from the motor section. Since the fluid being pumped frequently is a poor lubricant, for example water, it follows that it is essential to afford an adequate supply of the fluid to the bearings. The fluid or bearing lubricant moreover must be cooled in many applications to a temperature considerably below that of the fluid circulating through the pump casing of the motor-pump.

Inasmuch as one of the radial bearings usually employed in the motor section for mounting the motor and impeller shaft and also the thrust bearing arrangement are disposed at the lower end of the motor section adjacent the pump casing, the transfer of heat through the structural components and through the fluid in contact with these components to these bearings must be minimized insofar as possible. Transfer of heat in this manner is diminished by the provision of one or more thermal barriers of which the present invention contemplates an improved and novel design.

In certain applications of the motor-pump unit, wherein the latter is associated with a hermetically sealed system, it is necessary to provide a heat exchanger or cooling means for the bearing fluid which can be hermetically sealed within the motor-pump housing. The motor-pump unit similarly should be capable of being hermetically sealed with a minimum of time and expense. In furtherance of this purpose, the gasketing materials employed in connection with certain components of the motor-pump desirably are loaded by the mounting bolts which are employed to secure the motor housing to the pump casing of the unit. The invention also contemplates an improved arrangement for mounting the radial and thrust bearings associated with a motor-pump unit or other dynamoelectric machine.

In the operation of the motor-pump unit, a down thrust of the rotor and impeller shaft, referring to a vertical operating position thereof, usually is occasioned by rotation of the impeller. However, external pressure surges frequently are encountered which make desirable the use of means for preventing or absorbing up-thrust or down-thrust of the impeller shaft.

It is also desirable to provide means for relatively easy removal of the stator assembly from the motor-pump unit for purposes of repair or replacement. Such removal is facilitated by the invention, particularly where the stator assembly is hermetically sealed, by furnishing the stator assembly and component structural parts in the form of a removable cartridge. The stator cartridge is arranged for ready removal from the motor housing after first disengaging the latter and is provided with means for facilitating the transverse of heat from the stator cartridge to the stator housing, with which the aforementioned bearing lubricant and motor cooling system is associated.

It is therefore an object of the invention to provide a novel and efficient motor-pump unit adapted particularly for pumping fluids at elevated temperatures.

Another object of the invention is the provision of the motor-pump unit having improved means for lubricating or cooling the bearings thereof and for removing electrical losses from the motor section of the unit.

Still another object of the invention is to provide a motor-pump unit having improved means for facilitating removal of and for cooling the stator assembly.

A still further object of the invention is the provision of a novel thermal barrier and thrust bearing holder arrangement adapted for use in the dynamoelectric machinery.

A further object of the invention is the provision of a novel arrangement for mounting the aforesaid thermal barrier.

Another object of the invention is the provision of a motor-pump unit having novel and improved means associated with the driving shaft and with the impeller thereof for absorbing both upward and downward thrust of the driving shaft.

Still another object of the invention is the provision of a motor-pump unit having improved means for minimizing or eliminating flow of high temperature fluid from the pump casing to the motor housing of the unit.

A still further object of the invention is the provision of an improved thermal barrier and labyrinth seal arrangement.

Another object of the invention is the provision of a dynamoelectric machine having an improved cartridge type stator, whereby the stator is adapted for easy removal.

Another object of the invention is the provision of an improved arrangement for mounting the radial and the thrust bearings of the motor-pump unit or other dynamoelectric machine.

During the course of the following detailed description of an exemplary form of the invention, the foregoing and additional objects, features and advantages of the invention will be elaborated upon. The following description is to be read in conjunction with the accompanying drawings, in which.

Figure 1:
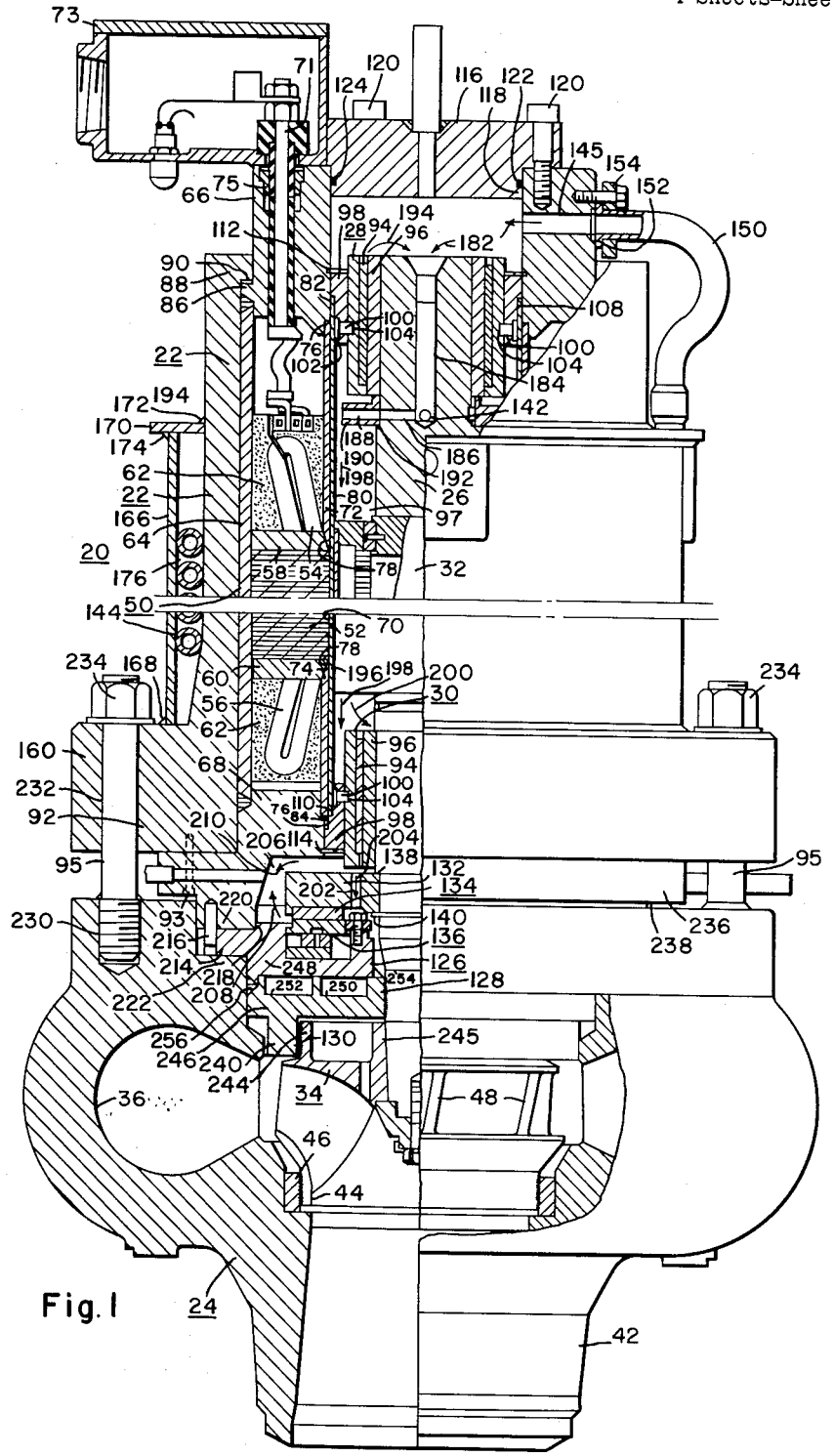
FIGURE 1 is an elevational view partially in section of one form of the invention as arranged for application with a motor-pump unit.
Figure 2:
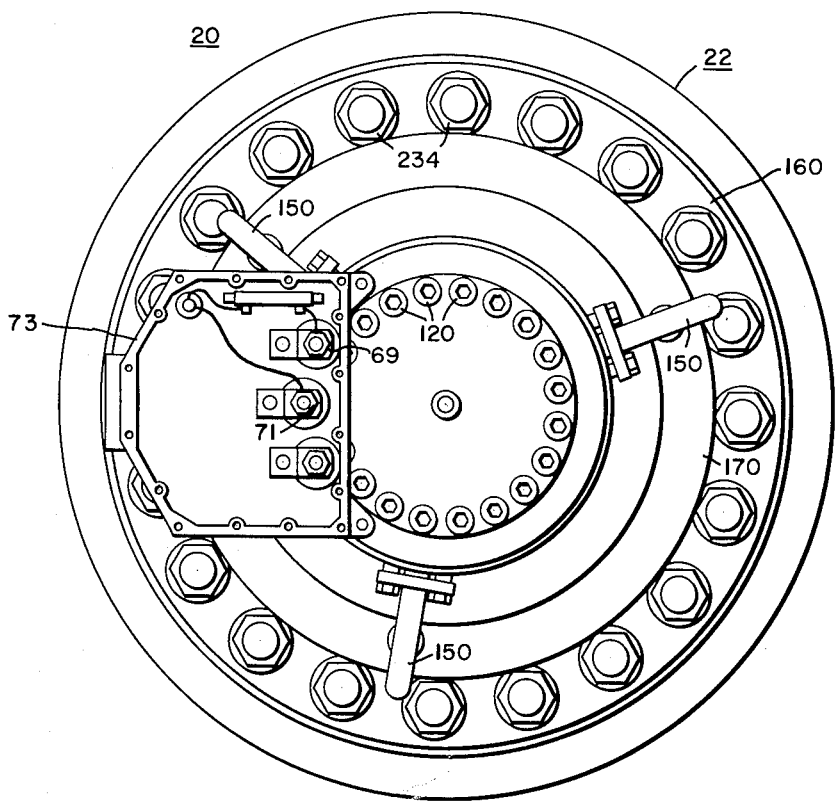
FIG. 2 is a partial top plan view of the motor-pump unit illustrated in FIG. 1.

With reference now more particularly to the drawings, the illustrative form of the invention shown therein is associated with a motor-pump unit 20 including a motor housing 22 and a pump casing 24. A driving shaft 26 is mounted for rotation within the motor housing 22 on a pair of radial bearing arrangements 28 and 30 presently to be described. A rotor 32 is secured to the driving shaft 26 for rotation therewith at a position intermediate the bearings 28 and 30. The lower end of the driving shaft as viewed in FIG. 1 of the drawings extends downwardly into the pump casing 24, to which end a pump impeller 34 is secured for rotation within the pump casing 24.

Figure 3A:
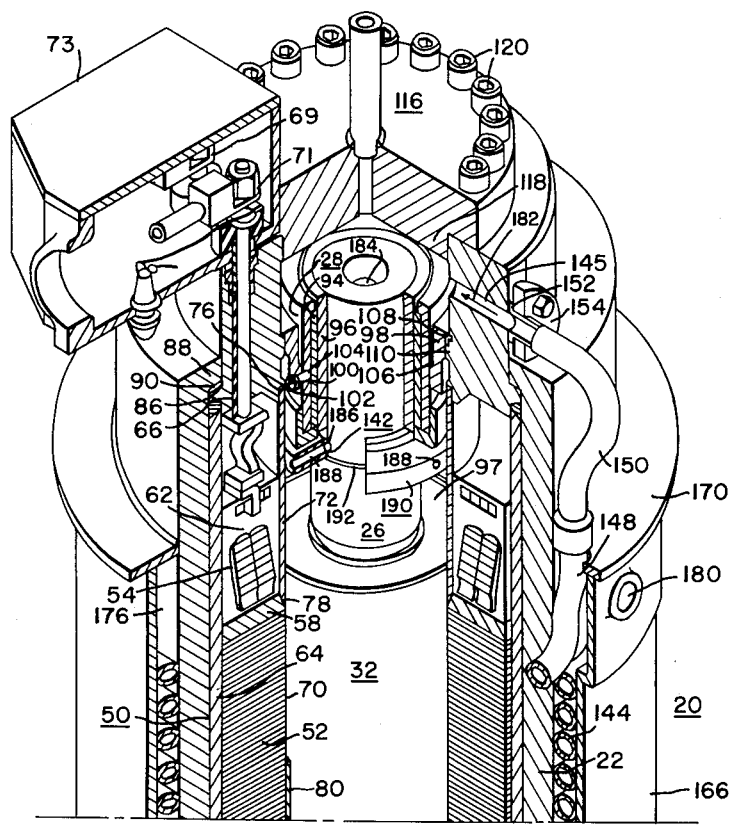
FIGS. 3A and 3B are an isometric view with parts being sectioned and other parts being broken away of the motor-pump unit illustrated in FIG. 1.
Figure 3B:
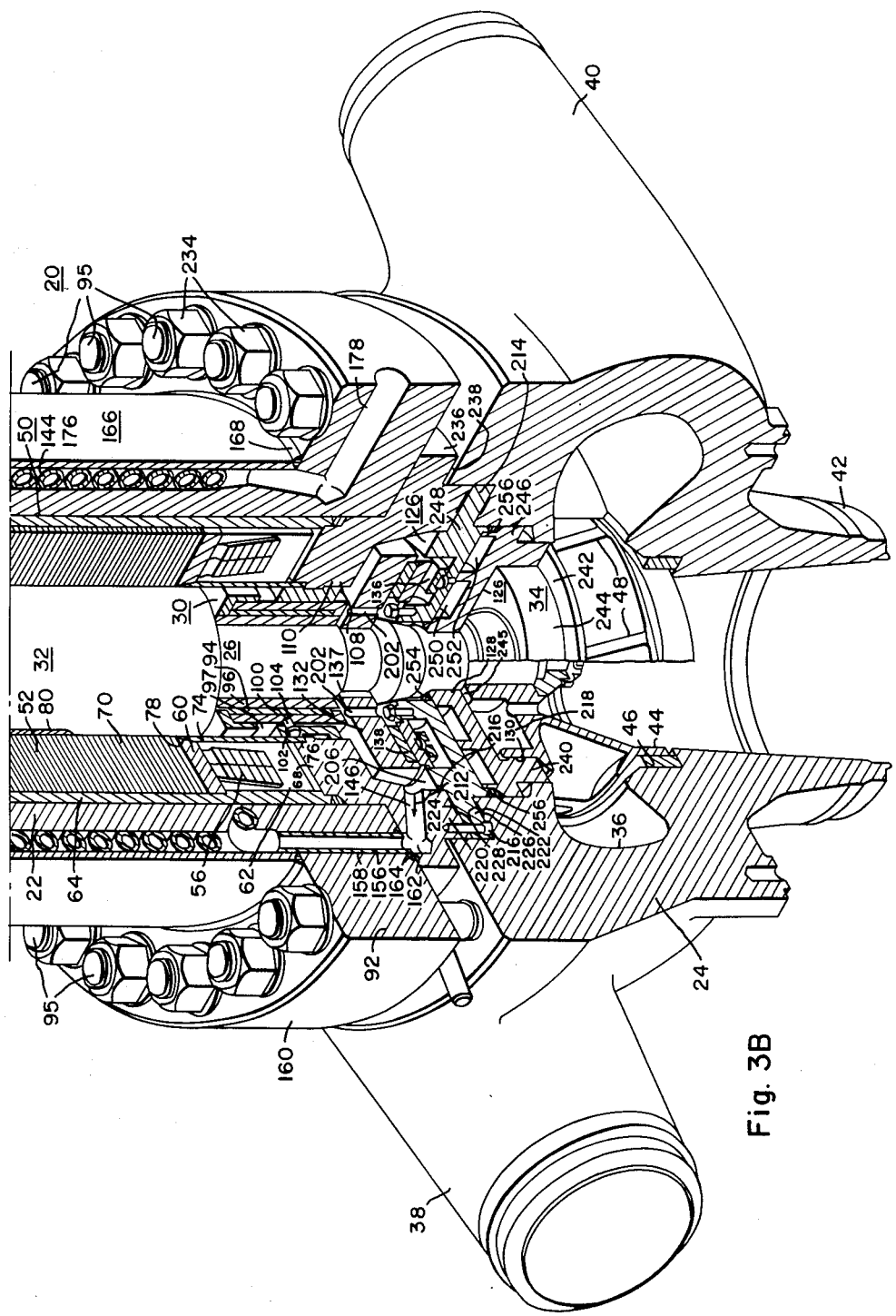

The interior of the pump casing 24 is formed into a spiral discharge passage 36, termed a volute, which is coupled in this arrangement to a pair of discharge conduits 38 and 40 (FIG. 3). The pump casing 24 also is provided with an intake or suction port 42 which communicates with eye 44 of the impeller 34. A labyrinth seal of conventional design, which is denoted generally by the reference character 46, is mounted in the pump casing 24 at a position adjacent the eye 44 of the impeller to prevent high pressure fluid in the volute 36 from flowing back to the intake port 42. The impeller 34 is provided with a plurality of vanes or blades 48 in a conventional manner, which propel fluid from the intake port 42 into the volute 36.

The rotor 32 is positioned within a generally tubular stator cartridge 50. The stator cartridge 50 includes a hollow stator core 52 provided with windings in the well known manner, the end turns of which are designated by the reference characters 54 and 56. The end turns 54 and 56 in this example extend through slotted end rings 58 and 60 and are embedded in a potting compound 62. The potting compound in this example is a filled, solventless, silicone resin capable of transferring heat to the adjacent structural components of the stator cartridge 50 and thence to the stator and bearing cooling system presently to be described. The stator 52 is encased within an outer shell 64 which is joined at its ends as by welding to a pair of annular end members or rings 66 and 68.

At each end of the stator core 52 adjacent the bore 70 thereof, a back-up sleeve 72 or 74 is mounted in alignment with the bore 70 and engages the end member 66 or 68 respectively. The outward ends of the sleeves 72 and 74 are desirably seated respectively in offset portions 76 formed at the inner periphery of the end members 66 and 68. The inward ends of the back-up sleeves 72 and 74 are tapered, as denoted by the reference characters 78, and are seated at their inner peripheral edges in the end rings 58 and 60, which are provided thereat with a complementary tapered configuration. With this arrangement a continuous inner surface is imparted to the stator cartridge 50 consisting of the inner periphery of the back-up sleeves 72 and 74 and of the adjacent portions of the end members 66 and 68 and by the bore 70 of the stator 52.

The stator 52 is hermetically sealed within the cartridge 50 by means of a stator "can" or enclosure 80. The stator can 80 desirably is fabricated from a corrosion-resistant material, such as stainless steel, in order to ensure its integrity. The enclosure is hermetically sealed at its ends to the end members 66 and 68 respectively by means of annular sealing welds 82 and 84.

Terminals 69 and 71 for the stator 52 extend longitudinally through suitable apertures in the upper end member 66 for connection to the stator windings. The outward ends of the terminals 69 and 71 are housed within a connection box 73. With this arrangement, by removing the box 73, the housing 22 can be removed and then the stator cartridge 50 can be removed from the rotor 32 and component parts can be withdrawn from the interior of the cartridge 50 without otherwise disassembling or removing the terminals 69 and 71. It will also be seen that by removing the stator cartridge 50 and breaking the weld between the upper end of the cartridge shell 64 and the upper end member 66 and between the end member 66 and the stator enclosure 80, the inner portions of the terminals 69 and 71 can be replaced or repaired without otherwise removing the stator enclosure 80. In addition, the terminals 69 and 71 are sealed at the points of their entry into the end members 66 as denoted by the reference character 75 to prevent leakage from the stator cartridge in the event of rupture of the stator enclosure 80. The stator terminals 69 and 71, therefore, are removable with the stator cartridge 50 but do not require demounting, other than removal of the box 73, to remove the stator cartridge 50 from the motor housing 22.

The cartridge shell 64 fits relatively closely within the motor housing 22 and the upper end member 66 of the stator cartridge 50 is retainable by engagement between its annular shoulder 86 and an integral lip 88 formed at the upper end of the motor housing 22. In practice however, a gap 90 is left between the end member shoulder 86 and the housing lip 88 to compensate for manufacturing clearances and for differential longitudinal expansion between the cartridge shell 64 and the adjacent housing 22. The stator cartridge 50 therefore actually is positioned within the motor housing 22 by engagement of the lower end member 68, provided with a stepped configuration for this purpose, with mounting flange 92 at the lower end of the housing 22 and by additional means presently to be described. When operating the pump with a pressurized fluid, the fluid within the rotor cavity 97, of course, exerts a pressure radially to the stator cartridge 50 and therefore no longitudinal force is imparted to the upper end member 66.

To aid in assembling the motor-pump unit 20, the lower end member 68 of the stator cartridge is secured initially to the lower end 92 of the housing 22 by means of a plurality of bolts 93. Engagement between the lower end member 68 and the housing flange 92 is maintained after assembly of the motor-pump unit 20 by a plurality of main flange or mounting studs 95 and associated components presently to be described. However, in the event of rupture in the stator can 80, the system pressure, of course, would be applied to the interior of the stator cartridge in which case the upper end member 66 would be forced against the retaining lip 88 of the housing 22.

The radial bearings 28 and 30, which are employed as aforesaid for mounting the driving shaft, are supported respectively by the stator end members 66 and 68. The bearing assemblies 28 and 30 each comprise a bearing cartridge 94 of known design which is arranged for bearing engagement with a shaft sleeve or journal member 96. The sleeves 96 are secured to the driving shaft 26 desirably by shrink-fitting and are positioned concentrically of the bearing cartridges 94, respectively. Each of the bearing cartridges 94 is relatively loosely mounted within an annular member 98 by means of a plurality of headed pins 100. The pins 100 extend through the associated member 98 and are retained by a bent over flange portion 102 forming part of the mounting member 98, as better shown in FIG. 3. In this arrangement, two such pins 100 are employed, which are inserted into suitably spaced indents 104 at the outer periphery of the bearing cartridge 94.

The bearing cartridge is mounted loosely upon the pins 100, as stated heretofore, and is stabilized by an annular rib 106 formed circumferentially upon the outer periphery of the cartridge 94 for engagement with the mounting member 98. The rib 106 operates to align the bearing cartridge 94 with the axis of rotation of the driving shaft 26. However, the bearing cartridge still is permitted to deviate slightly from this position to ensure perfect alignment with the shaft journal 96 in order to compensate for wearing and manufacturing tolerances. The mounting members 98 are retained within the cartridge end members 66 and 68 respectively by engagement between the ends 108 and 110 of the stator enclosure 80 and by a pair of retaining rings 112 and 114, as shown in FIG. 1. The retaining rings 112 and 114 are seated into circumferential grooves provided in the end members 66 and 68 adjacent the outward ends of the bearing mounting members 98.

When disassembling the motor-pump unit 20 to remove the bearings 28 and 30, it is only necessary to disengage the retaining rings 112 and 114. The lower retaining ring 114, of course, is accessible by disengaging the mounting studs 95 and raising the motor housing 22 and stator cartridge 50 secured thereto a short distance and inserting a suitable tool to remove the retaining ring 114. Following this operation, the stator 52 and the housing 22 can be lifted from the rotor 32 and associated components.

The upper bearing assembly 28 is accessible without disassembling the motor-pump unit by removing stator cartridge cap 116. The cap 116 is provided with a reduced portion 118 whereby the cap 116 is inserted into the open end of the upper stator cartridge end member 66 and secured in this position by means of a plurality of mounting bolts 120. The junction between the stator cartridge 50 and its cap 116 is sealed by means of a sealing ring 122 inserted into an annular groove formed in one of the confronting surfaces of the cap 116 and the stator cartridge 50. In this arrangement the groove 124 and ring 122 are applied to the reduced portion 118 of the stator cartridge cap. With this arrangement the rotor cavity 97 is sealed within the stator cartridge 50.

As will be described presently, the rotor cavity 97 is prevented from communicating with the interior of the pump housing or volute 36 by means of the lower radial bearing 30, a thermal barrier 126, and labyrinth seals 128 and 130 described hereinafter in greater detail.

A thrust runner 132 is secured to the driving shaft 26 for rotation therewith and is provided with an annular bearing member 134. The bearing member 134 is arranged for engagement with a Kingsbury type thrust bearing denoted generally by the reference numeral 136 or with a thrust bearing and thermal barrier arrangement of the type described and claimed in a copending application of G. E. Bollibon et al., entitled, Motor-Pump Unit, filed September 3, 1958, Serial No. 758,809, now Patent No. 2,972,309, and assigned to the assignee of the present application. Relative rotation between the thrust runner 132 and the driving shaft 26 is prevented by means of a sunk key or a spline 137 (FIG. 3), or the like, and is retained at this position by engagement with shoulder 138 of the shaft and by means of retaining ring 140 inserted into a circumferential groove formed upon the shaft.

Electrical losses are removed from the motor section of the unit 20 and the bearings thereof are lubricated and cooled by means of an improved cooling system. That portion of the cooling system which is in limited communication with the pumping volute 36 as described hereinafter can be hermetically sealed within the motor-pump unit 20. One form of the cooling lubricating system arranged in accordance with the invention is adapted for circulating a portion of the fluid being handled by the pump through the rotor chamber 97 and includes coiled heat exchanging tubing 144 and an auxiliary pump denoted generally by the reference character 142. The tubing 144 is wrapped upon the outer periphery of the motor housing 22 and the ends of the coiled tubing communicate with upper and lower portions of the rotor chamber 97 through inlet and outlet flow passages 145 and 146 as better shown in FIG. 3.

In this arrangement, the upper end 148 of the coiled tubing is coupled to a connecting conduit 150, the outer flanged end 152 of which is joined in alignment with the inlet passage 145 by a clamping ring and bolt arrangement 154. The lower end 156 of the coil tubing extends downwardly through aperture 158 of the mounting flange 92 in which the motor housing 22 terminates as aforesaid. The aperture 158 is aligned with aforementioned passage 146 and the junction therebetween is sealed by means of a gasket 162 inserted in a groove 164 surrounding this junction. The gasket 162 is compressed by engagement of the lower end 92 of the housing with the lower end member 68 of the stator cartridge 50.

The cooling coil 144 is hermetically enclosed in this arrangement in a jacket 166 surrounding the major proportion of the motor housing 22. The lower end of the jacket 166 is secured to the motor housing mounting flange 160 with an annular structural and sealing weld 168. The jacket 166 terminates at its upper end at an annular plate 170 which is seal-welded to the motor housing 22 and to the upper end of the jacket 166 by means of annular welds 172 and 174 respectively.

The coil tubing 144 is continuous, of course, so that no direct communication occurs between the tubing 144 and the annular space between the jacket 166 and the motor housing 22. The individual convolutions of the coil tubing 144 fit relatively loosely in the annular space 176 so that a heat exchanging fluid can flow upwardly or downwardly through the annular space 176 as viewed in FIG. 1 or 3 of the drawings. The aforementioned coolant flow is occasioned by passage of a suitable coolant medium, for example, water, through inlet and outlet passages 178 and 180, respectively, of the jacket 166. The inlet passage 178 is conducted through the mounting flange 160 of the housing 22 where it communicates with the lower end of the annular space 176, while the outlet passage 180 extends through the upper wall portion of the jacket 166. The outer portion of these passages 178 and 180 desirably are threaded to assist in coupling the cooling jacket 166 to an external coolant circulating system. The jacket 166 and the coiled tubing 144 inserted between the jacket and the motor housing form a heat exchanger whereby heat generated within the motor section of the unit 20 is transferred to another coolant medium circulated through the annular space 176 surrounding the tubing 144.

In the operation of the coolant system according to the present understanding of the invention, the coolant fluid and bearing lubricant enters the upper end of the rotor chamber 97 through the passage 145 as denoted by flow arrow 182 and then enters intake opening 184 formed centrally and longitudinally in the upper end of the driving shaft 26. The intake opening 184 forms a suction inlet for the auxiliary or lubricant pump 142 and is coupled to a plurality of radial passages 186 also formed adjacent the upper end of the driving shaft 26. In this arrangement of the invention, four such radial openings 186 are employed and these communicate with similar openings 188 extending through a flange member 190 secured to the driving shaft 26. The flange member 190 in the example is clamped between the upper bearing journal 96 and an integral shoulder 192 formed on the driving shaft. The aligned radial passages 188 and 186 serve to impel the incoming coolant and lubricating fluid, as the driving shaft is rotated, by centrifugal motion of the fluid through these passages.

As better shown in FIG. 1, a portion of the discharge fluid of the pump 142 flows through the upper bearing 28 and returns to the suction port 184 of the pump 142 as denoted by flow arrow 194. This portion of fluid acts to lubricate and to cool the upper bearing 28. The remainder of the fluid is passed downwardly through the motor gap 196, as denoted by flow arrows 198, where electrical losses of the stator and rotor, rotational losses of the rotor, and the like are removed. From the motor gap 196, the fluid is conducted through the lower radial bearing arrangement 30 as indicated by flow arrows 200 and thence a portion of the fluid is conducted through the thrust bearing 134, as denoted by flow arrows 204, via a plurality of transverse openings 202 furnished in the thrust runner 132. The fluid then flowing from the thrust bearing 132, and the remainder of the fluid exiting from the lower radial bearing 30, is conducted to an adjacent annular chamber 206 as shown by flow arrows 208 and 210, respectively. From the chamber 206 the lubricant is returned to the coiled tubing 144 through the inlet passage 146 formed as aforesaid in the lower stator cartridge end member 68 as denoted by the flow arrow 212 (FIG. 3). The lubricant and coolant fluid then flows through the tubing 144, where it is cooled by the external coolant medium circulated through the annular space 176 in coolant jacket 136.

The external cooling fluid also serves to remove electrical losses in the form of heat from the stator 52, which is conducted outwardly and radially through the cartridge shell 64 and the motor housing 22 to the fluid within the annular space 176. Although the cartridge shell 64 is furnished initially with suitable clearances to enable facile insertion of the stator cartridge 50 into the motor housing 22, the cartridge shell 64 will expand at the normal operating temperatures of the operating pump unit into contiguous engagement with the inner periphery of the motor housing 22 with the result that the rate of heat transfer between the cartridge shell 64 and the housing 22 is increased greatly. This expansion of the cartridge 64 relative to the motor housing 22 occurs on at least two accounts: Firstly, the cartridge shell 64 being adjacent the stator 52 is at slightly higher temperature. In the second place, the motor housing 22 is considerably thicker in the radial direction than is the cartridge shell 64 and therefore the radial expansion of the housing is less.

As indicated previously, the motor-pump unit 20 is provided with an annular thermal barrier arrangement 126 disposed generally in the path of heat conduction between the motor and the pump sections of the unit. The thermal barrier 126 in this arrangement is provided with an outwardly extending flange 214. The thermal barrier 126 is secured initially to the lower surface of the stator cartridge end member 68 by means of a plurality of machine screws 216 and is positioned concentrically of the end member 68 by means of an annular shoulder 218 formed upon the upper surface of the thermal barrier. In this fashion, the thermal barrier flange 214 is inserted between a relatively thick downwardly extending annular projection 220 of the lower end member 68 and a cooperating shoulder portion 222 formed adjacent the upper end of the pump casing 24. The end member projection 220 is closely fitted into the upper end portion of the pump casing 24 when the motor-pump unit 20 is assembled but is free to move a short distance downwardly thereof. The confronting surfaces in this arrangement of the end member projection 220 and the pump casing shoulder 222 are each provided with a relatively broad groove 224 or 226, respectively, into each of which a sealing gasket 228 is inserted, as better shown in FIG. 3B. Alternatively, of course, the gaskets 228 and grooves 224 and 226 can be applied to the upper and lower surfaces respectively of the thermal barrier flange 214.

As indicated previously, the housing flange 160 is secured to the upper end of the pump casing 24 by means of a plurality of studs 95. These studs are threaded into tapped holes 230 provided in the upper end of the casing 24 and protrude through alignable apertures 232 of the mounting flange 160, as better shown in FIG. 1, where the studs are secured by nuts 234. With this arrangement, it will be seen that the pump casing 24 is sealed to the stator cartridge 50 through the intermediate gaskets 228 and thermal barrier 126 and that the rotor cavity 97 formed within the stator cartridge 50 is sealed at its upper end by means of the stator cartridge cap 116. The lower end of the stator cavity 97 is adequately protected from the pumping volute 36 by means of thermal barrier 126 and the labyrinth seals 128 and 130 which are described below in greater detail. The integrity of the sealed-motor pump can be assured, if desired, by welding or otherwise sealing inlet and outlet ports 38, 40 and 42 to the system with which the motor-pump unit 20 is employed. Since to motor section of the unit 20 is sealed primarily by the stator cartridge 50 no gasketing is required at the junction between the stator lower end member 68 and the motor housing flange 160.

In this arrangement of the invention, however, outwardly extending end member flange 236 is not clamped between the housing flange 160 and the adjacent end of the pump casing 24 but is provided only as a convenient means for initially securing the end member 68 to the housing 22. Instead, a gap or clearance 238 is left between the underside of the flange 236 and the upper end surface of the pump casing 24 so that the full clamping force of the mounting studs 95 when secured is distributed between the mounting flange 160 and the upper end of the pump casing 24 via the lower end member 68 and the aforedescribed thermal barrier flange 214. Thus, the entire clamping force which holds the motor and the pump sections of the unit 20 together is imparted to the gaskets 228 (FIG. 3) associated with the thermal barrier 126. The use of the aforementioned gap 238, of course, ensures that the entire bearing contact is imparted directly to the thermal barrier flange 214 and gaskets 228 by the end member 68 and the upper end of the pump casing 24. In this manner, leakage of the high pressure fluid from the pump volute 36 to the exterior of the pump or into the motor section thereof by way of the thermal barrier flange 214 is prevented positively. The provision of the gap 238 also reduces insofar as possible the area of direct metallic contact between those components disposed between the motor and pump sections of the unit 20 thereby minimizing the heat-conductive paths between these sections.

The thermal barrier 126 also is provided with a downwardly extending tubular or annular projection 240 which forms an up-thrust bearing member in the event that up-thrust should be imparted to the driving shaft 26. Normally down-thrust is imparted to the driving shaft 26 by the suction or head induced by the rotating impeller 34. However, up-thrust can occur as by reverse pressure surges in the system with which the motor-pump unit is being employed. In this arrangement the thermal barrier projection 240 is arranged in proximity to a shoulder portion 242 of the impeller 34 which portion is disposed adjacent the hub 244 of the impeller. In the event of up-thrust, then, the shoulder portion 242 would engage the lower surface of the thermal barrier projection 240. Similar contact would occur between inner portion 245 of impeller hub 244 and the adjacent lower surface of the thermal barrier component 246.

More specifically, the projection 240 is secured to the lower one of two annular mating parts 246 and 248 comprising the thermal barrier 126. The lower part 246 is provided with a pair of concentric grooves 250 and 252 formed in the confronting surface thereof. The parts 246 and 248 are hermetically sealed to one another by a pair of annular structural and sealing welds 254 and 256 arranged at the inner and outer peripheries, respectively, of the thermal barrier. With this arrangement stagnant volumes are hermetically sealed within the grooves 250 and 252 and thus are disposed in the path of heat conduction between the pump volute 36 and the motor section of the motor-pump unit and particularly the down-thrust bearing arrangement 134. The upper component 248, to which the aforedescribed thermal barrier flange 214 is secured, is provided with an annular groove wherein the supporting components of the thrust bearing 134 are mounted.

The inner periphery of the lower thermal barrier component 246 is provided with the labyrinthine seal 128 which prevents or minimizes the flow of fluid between the thermal barrier 126 and the adjacent portion of the driving shaft 26. In this arrangement the thermal barrier 128 can be formed with a plurality of circumferential grooves formed in a closely spaced, parallel array upon the inner surface of the lower thermal barrier component 246. As a result a plurality of relatively thin ridges are formed upon the aforesaid surface which are disposed in close proximity with the driving shaft 26. These ridges collectively provide a high resistance barrier to the flow of fluid thereacross and accordingly, during operation of the motor-pump unit 20, practically no fluid is interchanged between the motor and pump sections thereof. The labyrinthine seal 130 is similar in construction but is formed upon the inner perhiphery of the annualr bearing projection 240 of the lower thermal barrier component 246 and thus is disposed similarly in close proximity to the hub 244 of the impeller 34. With the provision of the labyrinthine seals 128 and 130, communication of fluid between the motor and pump sections of the motor-pump unit is virtually non-existent.

From the foregoing description it will be apparent that a novel and efficient motor-pump unit has been disclosed herein. It will be apparent that certain features of the invention, for example the stator cartridge 50, the rotor, stator, and bearing cooling system, can be adapted readily to other forms of dynamoelectric machinery. It will be understood therefore that the accompanying descriptive materials are presented for purposes of exemplifying the invention and should not be interpreted as limitative thereof.

Numerous embodiments therefore will occur to those skilled in the art without departing from the spirit and scope of the invention. Moreover, it is to be understood that certain features of the invention can be employed without a corresponding use of other features.

We claim as our invention:

1. In a motor pump unit, the combination comprising a hollow motor housing and a hollow pump casing, a thermal barrier disposed between said motor housing and said pump casing, a rotor and a shaft located in said motor housing, said shaft having one end extending through said thermal barrier into said pump casing, a pump impeller mounted on said one end of said shaft, interengaging thrust limiting means formed on opposed surfaces of said impeller and said thermal barrier, a thrust runner coupled to said shaft and located in said motor housing adjacent said thermal barrier, and thrust limiting means coupled to said thermal barrier and disposed to engage said thrust runner.

2. In combination, a thermal barrier for use with a motor pump unit and the like including a relatively low temperature motor housing, a relatively high temperature pump casing, and means for clamping said housing and said casing together; said thermal barrier being disposable generally between said housing and said casing and having a cavity enclosed therein and disposed in the path of heat conduction therebetween, first thrust bearing means secured to said thermal barrier and disposed adjacent said motor housing, a thrust runner mounted for rotation in said motor housing, said first bearing means being engageable with said thrust runner, and second thrust bearing means secured to said thermal barrier and disposed adjacent said pump casing, an impeller mounted for rotation within said pump casing, said second bearing means being engageable with said impeller.

3. A motor-pump unit comprising an enclosure capable of maintaining a fluid therein, said enclosure including a motor housing and a pump casing; a rotor and stator mounted within said housing; an impeller disposed within said pump casing and secured to said rotor for rotation therewith; a thermal barrier disposed generally between said housing and said casing, said thermal barrier including at least one cavity enclosed therein and disposed generally in the path of heat conduction in said casing and said housing; means for clamping said housing and said casing together; said thermal barrier having an outwardly extending flange inserted between said housing and said casing so that the clamping force of said clamping means is transmitted in its entirety through said thermal barrier flange to support said thermal barrier within said enclosure; said rotor and said impeller being secured to a driving shaft mounted for rotation within said enclosure; a thrust runner mounted within said housing and secured to said driving shaft, said thrust runner being disposed adjacent to said thermal barrier; thrust bearing means mounted on the adjacent side of said thermal barrier and engageable with said thrust runner; and additional thrust bearing means secured to the opposite side of said thermal barrier and engageable with an adjacent portion of said impeller.

4. A thermal barrier for use with a motor-pump unit and the like including a relatively low temperature motor housing having a rotor and stator mounted therein, a relatively high temperature pump casing having an impeller mounted therein, and means for clamping said housing and said casing together; said thermal barrier being disposable generally between said housing and said casing and having at least one cavity enclosed therein and disposed generally in the path of heat conduction therebetween, said thermal barrier having an outwardly extending annular flange insertable between said housing and said casing at the junction thereof so that the clamping force of said clamping means is transmitted entirely through said thermal barrier flange to support said thermal barrier; thrust bearing means secured to one side of said thermal barrier and disposed adjacent said pump casing, said bearing means being engageable with said impeller; and additional thrust bearing means secured to the opposite side of said thermal barrier and disposed adjacent said motor housing, said last-mentioned bearing means being engageable with a thrust runner mounted for rotation with said rotor.

References Cited in the file of this patent

UNITED STATES PATENTS

| | | |
|---|---|---|
| 2,460,418 | Hart | Feb. 1, 1949 |
| 2,698,911 | Schaefer | Jan. 4, 1955 |
| 2,737,120 | Iranoff et al. | Mar. 6, 1956 |
| 2,763,214 | White | Sept. 18, 1956 |
| 2,768,584 | Nicol et al. | Oct. 30, 1956 |
| 2,871,791 | Litzenberg | Feb. 3, 1959 |
| 2,875,694 | Carter | Mar. 3, 1959 |
| 2,906,208 | White | Sept. 29, 1959 |

FOREIGN PATENTS

| | | |
|---|---|---|
| 200,935 | Australia | Nov. 10, 1955 |
| 204,562 | Australia | Nov. 17, 1955 |
| 543,365 | Italy | May 19, 1956 |